(12) United States Patent
Truong et al.

(10) Patent No.: US 11,827,344 B2
(45) Date of Patent: Nov. 28, 2023

(54) LOW NOISE DUCTED FAN

(71) Applicant: Bell Textron Inc., Fort Worth, TX (US)

(72) Inventors: Alexander Dang Quang Truong, Dallas, TX (US); Karl Schroeder, Southlake, TX (US); Michael John Ryan, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 147 days.

(21) Appl. No.: 17/116,726

(22) Filed: Dec. 9, 2020

(65) Prior Publication Data

US 2022/0177121 A1   Jun. 9, 2022

(51) Int. Cl.
*B64C 27/20* (2023.01)
*B64C 39/02* (2023.01)
(Continued)

(52) U.S. Cl.
CPC ............ *B64C 27/20* (2013.01); *B64C 39/024* (2013.01); *B64D 2033/0206* (2013.01);
(Continued)

(58) Field of Classification Search
CPC ..... B64C 27/20; B64C 27/22; B64C 29/0033; B64C 39/024; B64C 11/001;
(Continued)

(56) References Cited

U.S. PATENT DOCUMENTS

| | | | | |
|---|---|---|---|---|
| 3,253,806 A | * | 5/1966 | Eickmann | B64C 27/12 244/17.23 |
| 4,883,240 A | * | 11/1989 | Adamson | B64C 11/00 416/129 |

(Continued)

FOREIGN PATENT DOCUMENTS

| | | |
|---|---|---|
| GB | 957393 A | 5/1964 |
| GB | 1386481 A | 3/1975 |

(Continued)

OTHER PUBLICATIONS

Truong, Alexander, et al.; "Harmonic and Broadband Separation of Noise from a Small Ducted Fan"; American Institute of Aeronautics and Astronautics, 21st AIAA/CEAS Aeroacoustics Conference; Jun. 22-26, 2015; 18 pages.

(Continued)

*Primary Examiner* — Medhat Badawi
(74) *Attorney, Agent, or Firm* — Bradley Arant Boult Cummings LLP

(57) ABSTRACT

An exemplary ducted fan includes a duct having a central longitudinal axis, a rotor hub and stator hub extending along the central longitudinal axis, rotor blades extending from the rotor hub, each of the rotor blades operable to rotate about its own pitch-change axis, the pitch-change axes lying in a rotor plane that is generally perpendicular to the central longitudinal axis, each of the rotor blades having a rotor trailing edge and a rotor chord length, stators extending from the stator hub to an interior surface of the duct, each of the stators having a stator leading edge and a stator thickness, and a first separation between the rotor plane and the stator leading edge of not less than approximately 1.5 times the stator thickness.

10 Claims, 4 Drawing Sheets

US 11,827,344 B2

Page 2

(51) Int. Cl.
 *B64D 33/02* (2006.01)
 *B64U 10/13* (2023.01)
 *B64U 30/20* (2023.01)
 *B64U 50/14* (2023.01)
(52) U.S. Cl.
 CPC .............. *B64U 10/13* (2023.01); *B64U 30/20* (2023.01); *B64U 50/14* (2023.01)
(58) Field of Classification Search
 CPC ........ B64C 2201/027; B64C 2201/108; B64C 2201/162; B64D 2033/0206; B64D 27/24
 See application file for complete search history.

(56) References Cited

U.S. PATENT DOCUMENTS

| | | | | |
|---|---|---|---|---|
| 5,150,857 A * | 9/1992 | Moffitt | ................... | B64C 27/20 244/34 A |
| 5,295,643 A * | 3/1994 | Ebbert | ................. | B64C 39/024 428/117 |
| 5,588,618 A * | 12/1996 | Marze | .................... | B64C 27/82 244/17.19 |
| 6,450,445 B1 * | 9/2002 | Moller | .................... | B64C 29/02 244/12.6 |
| 7,044,422 B2 * | 5/2006 | Bostan | ................... | B64C 17/06 244/7 B |
| 8,636,246 B2 * | 1/2014 | Robertson | ............... | B64C 27/22 244/12.3 |
| 8,640,984 B2 * | 2/2014 | Kebrle | ...................... | F01D 5/10 244/17.19 |
| 8,967,525 B2 * | 3/2015 | Schneider | ............... | B64C 27/82 244/1 N |
| 10,287,010 B2 * | 5/2019 | Stamps | ................... | B64C 27/10 |
| 10,443,626 B2 * | 10/2019 | Mielke | ................. | F04D 29/666 |
| 11,203,421 B1 * | 12/2021 | Knoll | ................. | B64C 29/0033 |
| 11,420,762 B2 * | 8/2022 | Thompson | ............ | B64C 11/001 |
| 2003/0215325 A1 * | 11/2003 | Tsuchiya | ............... | F04D 29/324 415/119 |
| 2005/0082421 A1 * | 4/2005 | Perlo | ....................... | A63H 27/12 244/12.2 |
| 2006/0049304 A1 * | 3/2006 | Sanders, Jr. | ............ | B64C 27/12 244/23 A |
| 2006/0192047 A1 * | 8/2006 | Goossen | ................. | B64C 27/20 244/17.23 |
| 2006/0231675 A1 * | 10/2006 | Bostan | .................... | B64C 27/20 244/12.1 |
| 2007/0051848 A1 * | 3/2007 | Mantych | ................ | A63H 27/14 244/100 R |
| 2007/0221790 A1 * | 9/2007 | Goossen | .................... | G01P 5/14 244/53 B |
| 2007/0262195 A1 * | 11/2007 | Bulaga | ................... | B64C 27/52 244/12.4 |
| 2010/0108809 A1 * | 5/2010 | Bouldin | .................. | B64C 27/20 244/119 |
| 2011/0001017 A1 * | 1/2011 | Burdisso | .............. | B64C 11/001 244/23 A |
| 2017/0159674 A1 * | 6/2017 | Maciolek | .................. | B64C 7/02 |
| 2017/0274984 A1 * | 9/2017 | Beckman | .............. | B64C 39/024 |
| 2018/0057157 A1 * | 3/2018 | Groninga | .............. | B64C 39/008 |
| 2018/0273166 A1 * | 9/2018 | Arlton | ................... | B64C 27/605 |
| 2018/0334252 A1 | 11/2018 | Lin | | |
| 2018/0362160 A1 * | 12/2018 | Groninga | ................ | B64C 13/04 |
| 2019/0009895 A1 * | 1/2019 | Tu | ........................ | B64C 29/0025 |
| 2019/0135424 A1 * | 5/2019 | Baity | ...................... | B64C 39/10 |
| 2019/0337613 A1 * | 11/2019 | Villa | ....................... | B64C 27/10 |
| 2020/0094942 A1 * | 3/2020 | Jarrett | ................... | B64C 11/001 |
| 2020/0148354 A1 * | 5/2020 | Morris | .................... | B64C 27/28 |
| 2020/0180791 A1 * | 6/2020 | Kimberly | .............. | B64C 39/024 |
| 2020/0223530 A1 * | 7/2020 | Carpenter, Jr. | .......... | F04D 19/00 |
| 2020/0269980 A1 * | 8/2020 | Fink | ....................... | B64C 39/068 |
| 2021/0070431 A1 * | 3/2021 | NakaMats | ............. | B64C 39/024 |
| 2021/0101677 A1 * | 4/2021 | Thalheimer | .............. | B64C 27/54 |
| 2021/0139130 A1 * | 5/2021 | Schroeder | ............... | B64C 11/46 |
| 2021/0139139 A1 * | 5/2021 | Schroeder | .......... | B64C 29/0033 |
| 2021/0197957 A1 * | 7/2021 | Feeley | ................. | B64C 29/0033 |
| 2021/0199022 A1 * | 7/2021 | Feeley | .................. | F04D 29/545 |
| 2021/0300527 A1 * | 9/2021 | Thalheimer | ......... | B64C 29/0033 |
| 2021/0339850 A1 * | 11/2021 | Predonu | ................. | B64D 27/24 |
| 2021/0394888 A1 * | 12/2021 | Thompson | .............. | B64C 27/20 |
| 2021/0394899 A1 * | 12/2021 | Feeley | ................. | B64C 29/0033 |
| 2021/0403155 A1 * | 12/2021 | Neiser | .................... | B64D 27/24 |
| 2022/0024571 A1 * | 1/2022 | Thompson | .......... | B64C 29/0033 |
| 2022/0111952 A1 * | 4/2022 | Truong | .................... | B64C 27/10 |
| 2022/0169366 A1 * | 6/2022 | Truong | ............... | B64C 29/0025 |
| 2022/0169369 A1 * | 6/2022 | Truong | ................. | B64C 27/001 |
| 2022/0169376 A1 * | 6/2022 | Dugré | ..................... | B64C 27/82 |
| 2022/0177121 A1 * | 6/2022 | Truong | ................ | B64C 39/024 |

FOREIGN PATENT DOCUMENTS

| | | |
|---|---|---|
| GB | 1532815 A | 11/1978 |
| GB | 2259334 A | 3/1993 |
| WO | WO-2018156165 A1 | 8/2018 |

OTHER PUBLICATIONS

Jiang, Yuening, et al.; "Aerodynamics Optimization of a Ducted Coaxial Rotor in Forward Flight Using Orthogonal Test Design"; Hindawi; Shock and Vibration, vol. 2018; Article ID 2670439; May 28, 2018; 9 pages.

Luan, Hengxuan, et al.; "Axial Spacing Effects on Rotor-Rotor Interaction Noise and Vibration in a Contra-Rotating Fan"; Hindawi; International Journal of Aerospace Engineering, vol. 2019; Article ID 2125976; Feb. 7, 2019; 15 pages.

Wang, Zhenyu, et al.; "Impact of Rotor-Airframe Orientation on the Aerodynamic and Aeroacoustic Characteristics of Small Unmanned Aerial Systems"; Drones 2019, 3, 56; Jul. 12, 2019; 18 pages.

Zawodny, Nikolas S., et al.; "Investigation of Rotor-Airframe Interaction Noise Associated with Small-Scale Rotary-Wing Unmanned Aircraft Systems"; presented at the AHS 73rd Annual Forum, Fort Worth, Texas; May 9-11, 2017; 17 pages.

Prior, Stephen D.; "Reviewing and Investigating the Use of Co-Axial Rotor Systems in Small UAVs"; International Journal of Micro Air Vehicles, vol. 2, No. 1; Mar. 2010; 16 pages.

Schatzman, Natasha Lydia; "Aerodynamics and Aeroacoustic Sources of a Coaxial Rotor"; NASA/TM-2018-219895; Nov. 2018; 128 pages.

Truong, Alexander Dang Quang, et al.; "Low-Noise Rotor Configurations"; U.S. Appl. No. 17/106,481; dated Nov. 30, 2020; 30 pages.

Neiser, VTOL Aircraft, Feb. 8, 2020, U.S. Appl. No. 62/971,958 (Year: 2020).

* cited by examiner

LOW NOISE DUCTED FAN

BACKGROUND

This section provides background information to facilitate a better understanding of the various aspects of the disclosure. It should be understood that the statements in this section of this document are to be read in this light, and not as admissions of prior art.

A ducted fan is a propulsive apparatus in which fan are disposed within a duct. Multiple vehicles use ducted fans to generate propulsion for forward thrust, generating lift, and generation antitorque. Conventional ducted fans generally have a duct that houses a mechanical fan at its center. In operation the mechanical fan generates a propulsive force by using a power source to rotate the fan blades. Because the fan blades function within the confines of the duct, the mechanical fan must be secured in place to prevent the fan blades from striking the wall of the duct.

Conventional ducted fans use stators to provide structural support to the mechanical fan and hold it in place relative to the duct. Stators are attached to the central hub and extend radially to attach to the duct. The stators are located behind the fan blades and are usually aerodynamically shaped to allow easy passage of the airflow generated by the fan.

SUMMARY

An exemplary ducted fan includes a duct having a central longitudinal axis, a rotor hub and stator hub extending along the central longitudinal axis, rotor blades extending from the rotor hub, each of the rotor blades operable to rotate about its own pitch-change axis, the pitch-change axes lying in a rotor plane that is generally perpendicular to the central longitudinal axis, each of the rotor blades having a rotor trailing edge and a rotor chord length, stators extending from the stator hub to an interior surface of the duct, each of the stators having a stator leading edge and a stator thickness, and a first separation between the rotor plane and the stator leading edge of not less than approximately 1.5 times the stator thickness.

An exemplary aircraft includes a fuselage having a forward portion and an aft portion and a tiltable ducted fan including a duct having a central longitudinal axis, a rotor hub and stator hub extending along the central longitudinal axis, rotor blades extending from the rotor hub, each of the rotor blades operable to rotate about its own pitch-change axis, the pitch-change axes lying in a rotor plane that is generally perpendicular to the central longitudinal axis, each of the rotor blades having a rotor trailing edge and a rotor chord length, stators extending from the stator hub to an interior surface of the duct, each of the stators having a stator leading edge and a stator thickness, and a first separation between the rotor plane and the stator leading edge of not less than approximately 1.5 times the stator thickness.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
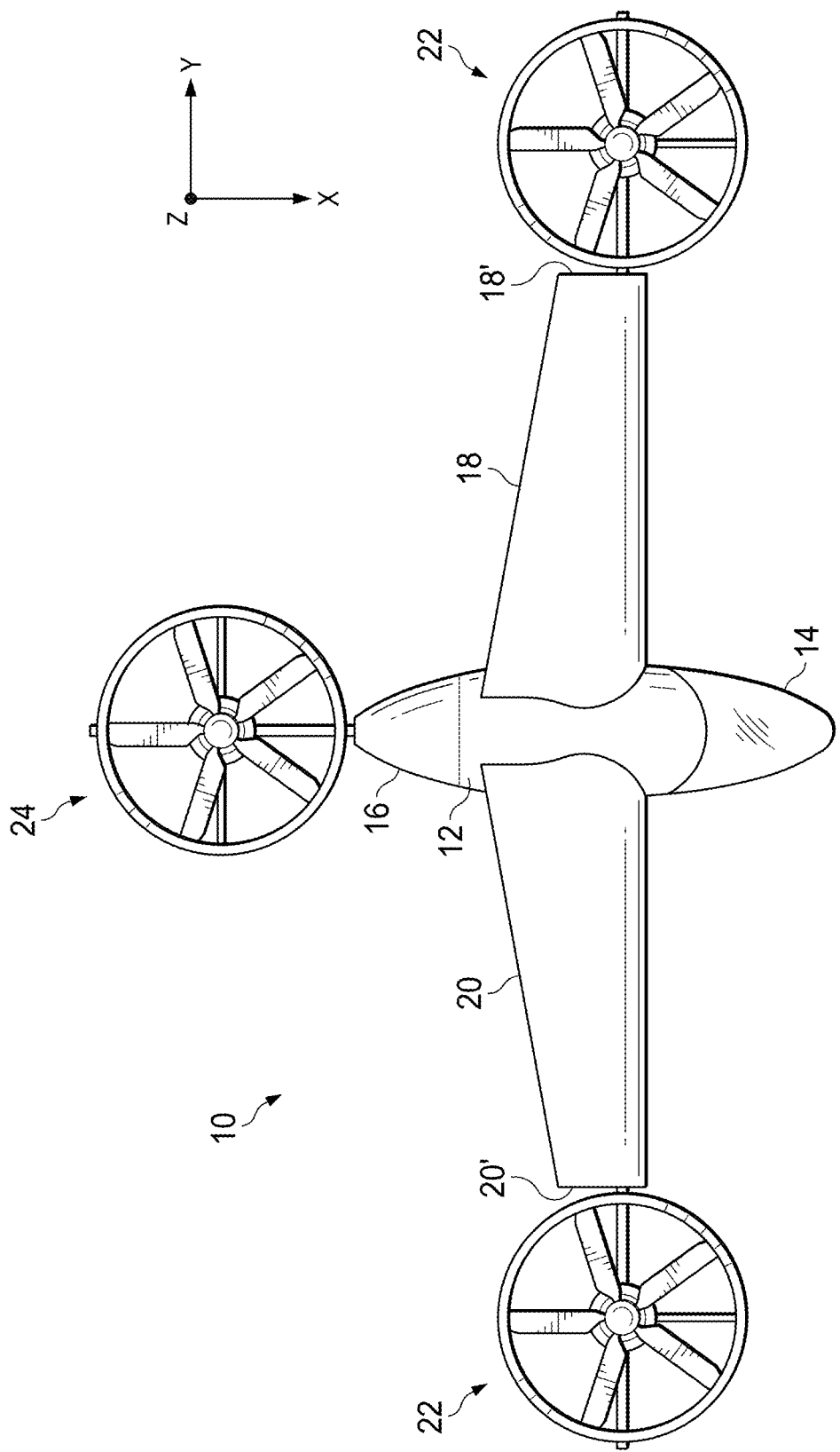
FIG. 1 illustrates a top view of an exemplary aircraft, in hover mode, that may incorporate a low noise ducted fan according to aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 2:
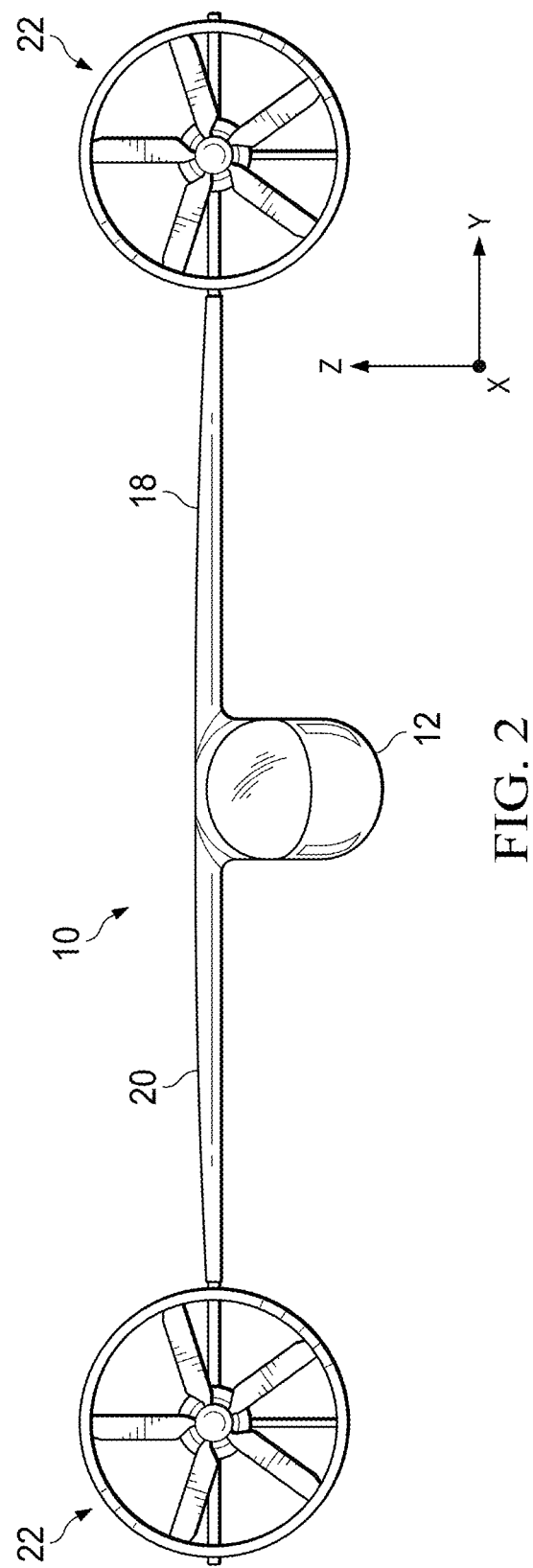
FIG. 2 illustrates an exemplary aircraft, in airplane mode, that may incorporate a low noise ducted fan according to aspects of the disclosure.
Figure 3:
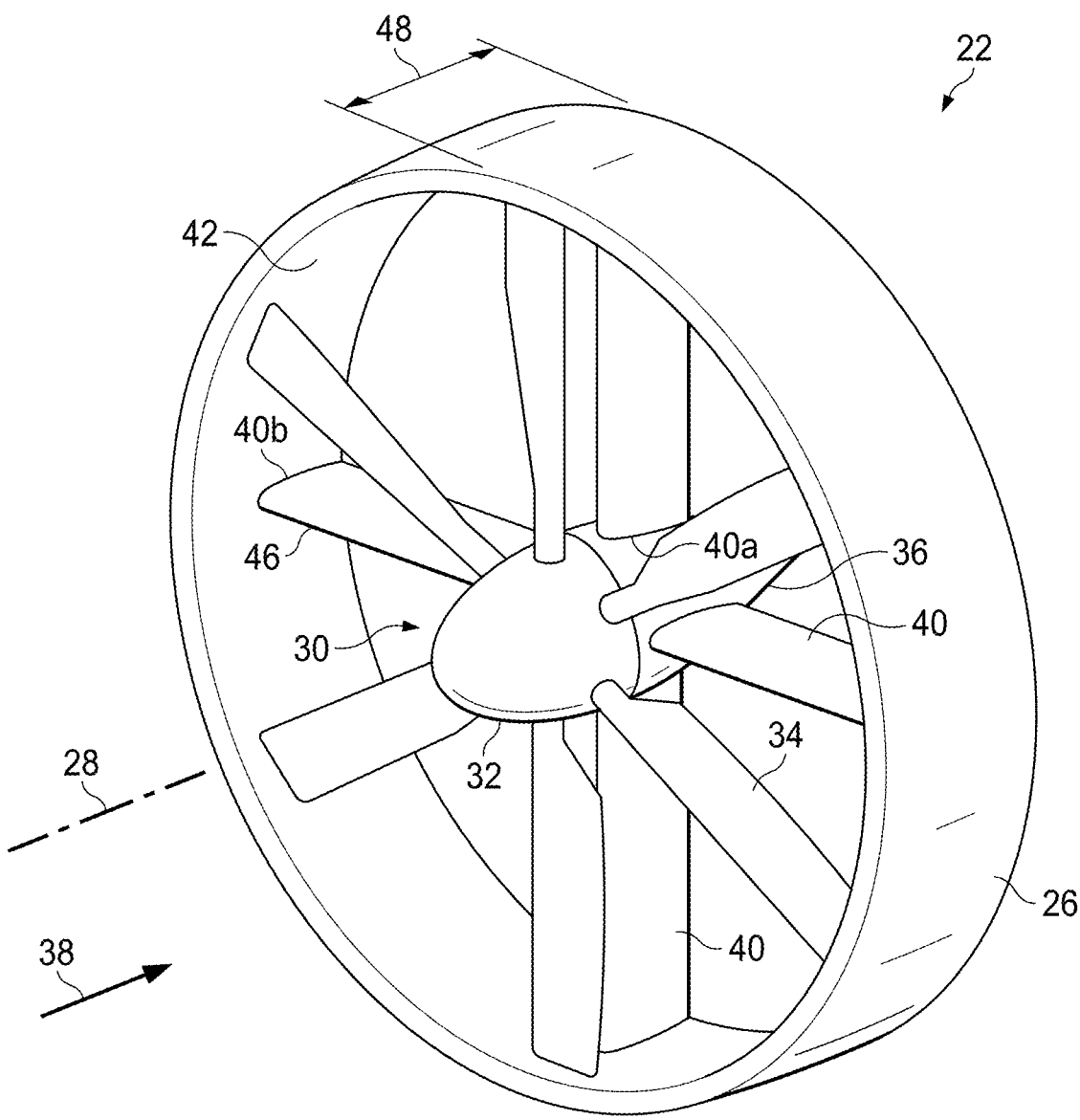
FIG. 3 illustrates an exemplary low noise ducted fan according to aspects of the disclosure.

FIGS. 1-3 depict three mutually orthogonal directions X, Y, and Z forming a three-dimensional frame of reference XYZ. Longitudinal axis X corresponds to the roll axis that extends through the center of aircraft 10 in the fore and after directions. Transverse axis Y is perpendicular to longitudinal axis X and corresponds to the pitch axis (also known as a control pitch axis or "CPA"). The X-Y plane is considered to be "horizontal." Vertical axis Z is the yaw axis and is oriented perpendicularly with respect to the X-Y plane. The X-Z plane and Y-Z plane are considered to be "vertical."

FIGS. 1 and 2 illustrate an exemplary vertical takeoff and landing (VTOL) aircraft 10 in different flight modes. FIG. 1 illustrates exemplary aircraft 10 in a VTOL or hover mode and FIG. 2 illustrates aircraft 10 in a forward flight or airplane mode. Aircraft 10 includes a fuselage 12 as a central main body. Fuselage 12 extends parallel to longitudinal axis X from a fuselage foward end 14 to fuselage aft end 16. Aircraft 10 has a wing 18 and a wing 20 extending laterally in opposite directions from fuselage 12 generally parallel to the transverse axis Y to respective wing tips 18' and 20'. Aircraft 10 includes a rotary propulsion system incorporating tiltable, low noise, ducted fans 22 located at wing tips 18' and 20'. Tiltable ducted fans 22 may be tilted between a horizontal orientation in the hover mode and a vertical orientation in the airplane mode. Tiltable ducted fans 22 may also pivot, in particular in the hover mode, to provide yaw control by differential left and right ducted fan tilt. The illustrated exemplary aircraft 10 includes a tail rotor 24, illustrated as a ducted fan. Teachings of certain embodiments recognize that tail rotor 24 may represent one example of a rotor; other examples include, but are not limited to, tail propellers, and fans mounted inside and/or outside the aircraft. It should be appreciated that teachings herein apply to manned and unmanned vehicles and aircraft including without limitation airplanes, rotorcraft, hovercraft, helicopters, and rotary-wing vehicles.

FIG. 3 illustrates an exemplary low noise ducted fan 22 according to aspects of the disclosure. With additional reference to FIGS. 4-6, ducted fan 22 includes a duct 26 having a central longitudinal axis 28. Duct 26 surrounds, or partially encloses, a central hub 30 that extends along central longitudinal axis 28. Central hub 30 includes a rotor hub 32 from which a plurality of blades 34 extend. Blades 34 can be collectively manipulated to control direction, thrust, and lift of the aircraft. Central hub 30 includes a nacelle or stator hub 36 that may house a power supply such as an electric or hydraulic motor. Stator hub 36 is positioned aft and downstream of rotor hub 32 relative to the direction of airflow 38 through duct 26.

Ducted fan 22 includes stators 40 that extend from a root 40a attached to stator hub 32 to a distal end 40b attached to the interior surface 42 of duct 26. Stators 40 structurally support central hub 30 and take up the reactive torque of the rotor assembly. Stators 40 may include primary stators that house vanes that vector airflow through the duct and allow for directional control of the aircraft and secondary vanes that do not include vanes.

To reduce sound emission, ducted fan 22 may have a greater number of blades 34 than stators 40. In some embodiments, the blade count is not an integer of the stator count. Rotor blades 34 and stators 40 are angularly distributed in some embodiments to reduce noise. An exemplary ducted fan may have an asymmetrical stator arrangement.

Figure 4:
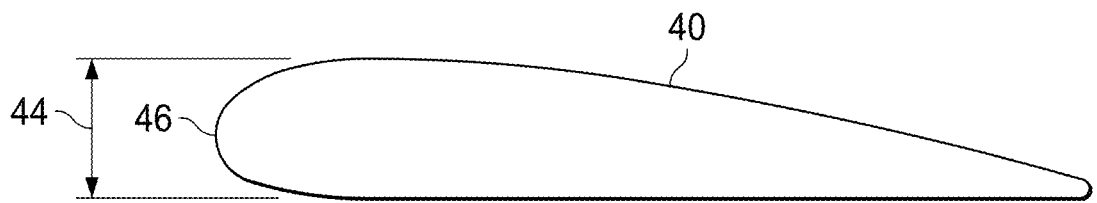
FIG. 4 illustrates a view of an exemplary low noise ducted fan stator according to aspects of the disclosure.

With additional reference to FIG. 4, stators 40 have an aerodynamic profile to minimize noise. The thickness 44, for example the maximum thickness, of stator 40 is selected to reduce the size of duct 26 while ensuring sufficient strength to support stator hub 36. It is desirable to position stators 40, e.g. the stator leading edge 46, as close as possible to blades 34 to maximize the stator contact with duct 26 to achieve the required mechanical strength and to minimize the size, e.g., duct length 48. However, positioning the stators too close to the rotor blades will result in excessive noise due to rotor-stator interaction and/or rotor-wake interaction.

Figure 5:
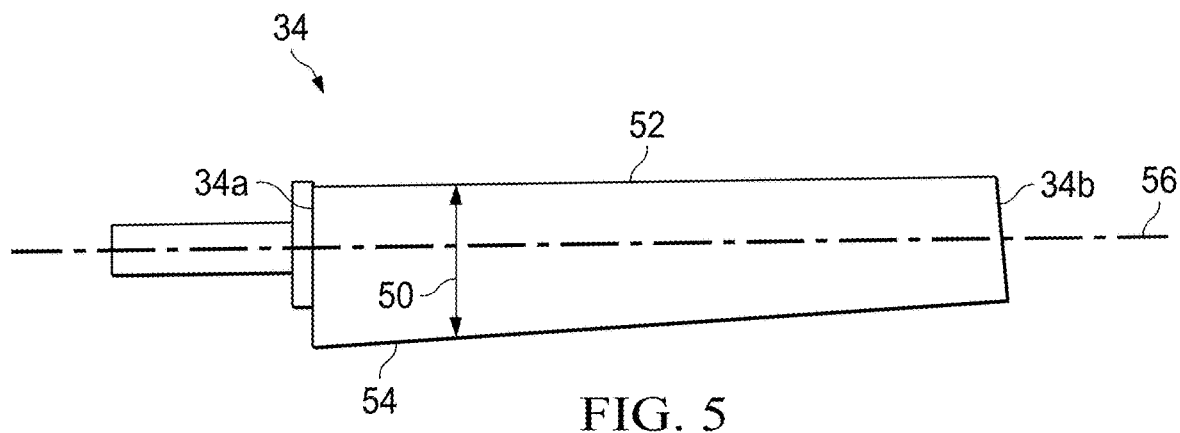
FIG. 5 illustrates an exemplary rotor blade of a low noise ducted fan according to aspects of the disclosure.

FIG. 5 illustrates an exemplary rotor blade 34 having a tapered shape. Rotor blade 34 has a span extending from root 34a to tip 34b and a rotor chord length 50 extending from rotor leading edge 52 to rotor trailing edge 54. Rotor blade 34 has a pitch-change axis 56 that defines a rotor plane 58 (FIG. 6) in which the rotor blades rotate. Rotor trailing edge 54 is inclined toward pitch-change axis 56, and thus rotor plane, from root 34a to tip 34b. Chord length 50 decreases as rotor blade 34 approaches tip 34b.

Figure 6:
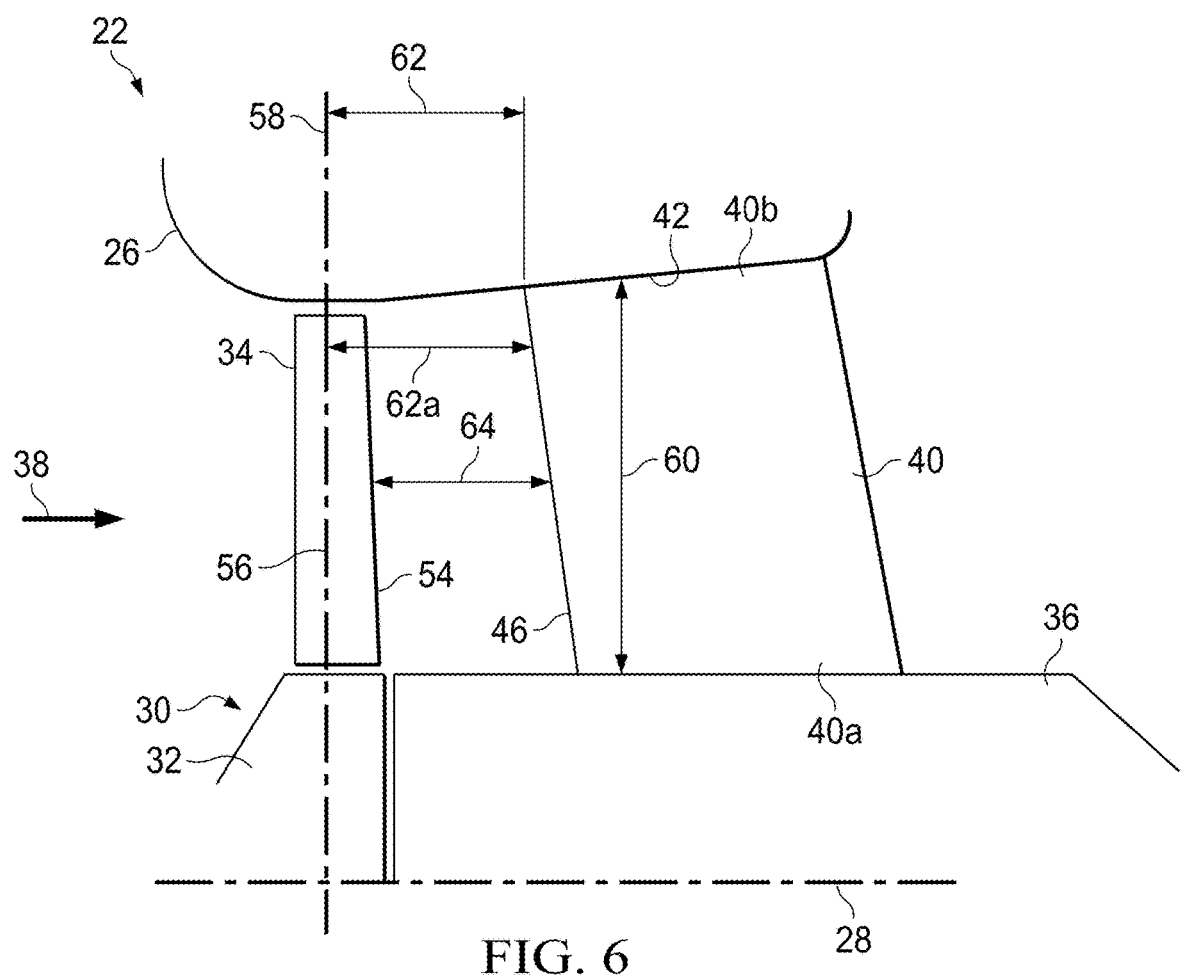
FIG. 6 is a partial side view of an exemplary low noise ducted fan according to aspects of the disclosure.

FIG. 6 is a sectional view of an exemplary ducted fan 22. With additional reference to FIGS. 1-5, stator 40 is swept forward with stator leading edge 46 inclined upstream, toward rotor plane 58, extending along the stator span 60 from proximate stator hub 36 to interior surface 42 of duct 26. The forward swept stator 40 attaches stator distal end 40b to duct 26 proximate to the rotor blade tip and maintains a noise mitigating separation between the stators and rotor blades. A first separation 62, or minimum separation, is maintained between rotor plane 58 and stator leading edge 46 of at least approximately 1.5 times stator thickness 44. First separation 62 is maintained to reduce noise due to rotor-stator interaction. In an embodiment, separation 62 is not less than approximately 1.5 times stator thickness 44. A first separation ratio of less than 1.5 will operate in the exponential region of the noise curve where small changes in separation can result in large increases in noise. A separation 62 above approximately 2.7 times the stator thickness may not provide significant additional noise reduction and will require additional structure weight. In an embodiment, first separation 62 is approximately 1.5 times the stator thickness. The minimum first separation may be determined at the closest separation 62a between rotor plane 58 and stator leading edge 46. In another embodiment, first separation 62 is approximately 1.5 to 2.7 times stator thickness 44. In an embodiment, first separation 62 is approximately 1.5 to 2.5 times stator thickness. In an embodiment, first separation is approximately 2.0 times the stator thickness.

A second noise source is the rotor-wake interaction. To minimize this noise source, a second separation 64 between rotor trailing edge 54 and stator leading edge 46 of at least approximately rotor chord length 50 is maintain. Second separation 64 may be greater than rotor chord length 50. In an embodiment, second separation 64 is not less than approximately rotor chord length 50.

As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A ducted fan comprising:
   a duct having a central longitudinal axis;
   a rotor hub and a stator hub extending along the central longitudinal axis;
   a plurality of rotor blades extending from the rotor hub, each of the plurality of rotor blades operable to rotate about a respective pitch-change axis of the rotor hub, the pitch-change axes lying in a rotor plane that is substantially perpendicular to the central longitudinal axis, each of the rotor blades having a rotor trailing edge and a rotor chord length; and
   a plurality of stators extending from the stator hub to an interior surface of the duct, each of the plurality of stators having a stator leading edge and a stator thickness;
   wherein a first separation between the rotor plane and the stator leading edge is 1.5-2.7 times the stator thickness;
   wherein a second separation between the rotor trailing edge and the stator leading edge is not less than the rotor chord length.

2. The ducted fan of claim 1, wherein the first separation is substantially 1.5 times the stator thickness.

3. The ducted fan of claim 1, wherein a number of the rotor blades and the stators is unequal.

4. The ducted fan of claim 1, wherein a number of the rotor blades is greater than a number of the stators.

5. The ducted fan of claim 1, wherein the stator leading edge is inclined toward the rotor plane extending from the stator hub to the interior surface of the duct.

6. The ducted fan of claim 1, wherein the rotor trailing edge is inclined toward the rotor plane extending from the rotor hub toward the interior surface of the duct.

7. The ducted fan of claim 1, wherein:
   the stator leading edge is inclined toward the rotor plane extending from the stator hub to the interior surface of the duct; and
   the rotor trailing edge is inclined toward the rotor plane extending from the rotor hub toward the interior surface of the duct.

8. The ducted fan of claim 1, wherein the stator leading edge is inclined toward the rotor plane extending from the stator hub to the interior surface of the duct; and
   the rotor trailing edge is inclined toward the rotor plane from the rotor hub toward the interior surface of the duct.

9. An aircraft comprising:
   a fuselage having a forward portion and an aft portion; and
   a tiltable ducted fan comprising:
      a duct having a central longitudinal axis;
      a rotor hub and a stator hub extending along the central longitudinal axis;
      a plurality of rotor blades extending from the rotor hub, each of the plurality of rotor blades operable to rotate about a respective pitch-change axis of the rotor hub, the pitch-change axes lying in a rotor plane that is generally perpendicular to the central longitudinal axis, each of the plurality of rotor blades having a rotor trailing edge and a rotor chord length; and
      a plurality of stators extending from the stator hub to an interior surface of the duct, each of the a plurality of stators having a stator leading edge and a stator thickness;
   wherein a first separation between the rotor plane and the stator leading edge is 1.5-2.7 times the stator thickness;
   wherein a second separation between the rotor trailing edge and the stator leading edge is not less than the rotor chord length.

10. The aircraft of claim 9, wherein the stator leading edge is inclined toward the rotor plane extending from the stator hub to the interior surface of the duct.

* * * * *